United States Patent
Steinder et al.

(10) Patent No.: US 9,912,607 B2
(45) Date of Patent: *Mar. 6, 2018

(54) AUTOMATIC SCALING OF AT LEAST ONE USER APPLICATION TO EXTERNAL CLOUDS

(71) Applicant: International Business Machines Corporation, Armonk, NY (US)

(72) Inventors: Malgorzata Steinder, Leonia, NJ (US); Merve Unuvar, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 33 days.

This patent is subject to a terminal disclaimer.

(21) Appl. No.: 14/745,972

(22) Filed: Jun. 22, 2015

(65) Prior Publication Data

US 2016/0134558 A1    May 12, 2016

Related U.S. Application Data

(63) Continuation of application No. 14/539,543, filed on Nov. 12, 2014.

(51) Int. Cl.
G06F 15/173 (2006.01)
H04L 12/911 (2013.01)
(Continued)

(52) U.S. Cl.
CPC ......... *H04L 47/783* (2013.01); *G06Q 10/063* (2013.01); *H04L 67/10* (2013.01); *H04L 67/16* (2013.01)

(58) Field of Classification Search
CPC .............................. H04L 67/10; H04L 47/70
(Continued)

(56) References Cited

U.S. PATENT DOCUMENTS 8,661,120 B2  2/2014 Atchison et al.
8,769,531 B2  7/2014 Anderson et al.
(Continued)

FOREIGN PATENT DOCUMENTS

EP   2648391 A1  10/2013
WO  2010099514 A2  9/2010
WO  2013119841 A1  8/2013

OTHER PUBLICATIONS

R. Buyya et al.; "InterCloud: Utility-Oriented Federation of Cloud Computing Environments for Scaling of Application Services"; Algorithms and architectures for parallel processing; Springer Berlin Heidelberg; 2010; pp. 13-31.
(Continued)

*Primary Examiner* — Duyen Doan
(74) *Attorney, Agent, or Firm* — Harrington & Smith

(57) ABSTRACT

Embodiments of the invention provide a method, a system and a computer program product configured to automatically auto-scale a user compute instance to multiple cloud providers while considering a multiplicity of user requirements. The method, executed on a digital data processor, includes obtaining information, via a user interface, that is descriptive of user cloud computing related preferences, including a user cloud computing budgetary preference. The method further includes sensing properties of a plurality of clouds and making decisions, based at least on the obtained information and on the sensed properties, of when to scale up or scale down the user cloud instance, of selecting one of the plurality of clouds as where to scale the user cloud instance, and determining which resource or resources of the selected cloud to add or remove from the selected cloud. The method further includes automatically executing the decisions on the selected cloud.

16 Claims, 7 Drawing Sheets

(51) Int. Cl.
*G06Q 10/06* (2012.01)
*H04L 29/08* (2006.01)

(58) Field of Classification Search
USPC .............................. 709/206, 226, 224–225
See application file for complete search history.

(56) References Cited

U.S. PATENT DOCUMENTS

| | | | |
|---|---|---|---|
| 2010/0332262 A1* | 12/2010 | Horvitz ................. | G06F 9/5027 705/4 |
| 2011/0078303 A1* | 3/2011 | Li ........................... | G06F 9/505 709/224 |
| 2012/0179824 A1* | 7/2012 | Jackson ................ | G06F 9/5027 709/226 |
| 2013/0067090 A1* | 3/2013 | Batrouni ............. | H04L 67/1097 709/226 |
| 2013/0212576 A1* | 8/2013 | Huang ................. | G06F 9/45558 718/1 |
| 2014/0201218 A1 | 7/2014 | Catalano et al. | |
| 2014/0337832 A1* | 11/2014 | Adogla ............... | G06F 9/45533 718/1 |
| 2015/0067169 A1* | 3/2015 | Povolny ................ | H04L 47/781 709/226 |
| 2015/0067171 A1* | 3/2015 | Yum .................... | H04L 67/2809 709/226 |
| 2015/0113120 A1* | 4/2015 | Jacobson ................. | G06N 5/04 709/224 |
| 2015/0172204 A1* | 6/2015 | Anderson ............... | H04L 47/70 709/224 |
| 2015/0288569 A1* | 10/2015 | Agarwal ................. | H04L 41/12 709/224 |
| 2016/0134557 A1* | 5/2016 | Steinder ................ | H04L 47/783 709/226 |
| 2016/0134558 A1 | 5/2016 | Steinder | |

OTHER PUBLICATIONS

L. Vaquero et al.; "Dynamically Scaling Applications in the Cloud"; ACM SIGCOMM Computer Communication Review, vol. 41, No. 1; Jan. 2011; pp. 45-52.

P. Reinhold et al.; "Hybrid Cloud Architecture for Software-as-a-Service Provider to Achieve Higher Privacy and Decrease Security Concerns about Cloud Computing"; Cloud Computing 2014: The Fifth International Conference on Cloud Computing, GRIDs, and Virtualization; 2014; pp. 94-99.

I. Balatinac et al.; "Architecting for the Cloud"; Master Thesis in Computer Science, Malardalen University Sweden; May 2014; whole document (108 pages).

T. Guo et al.; "Cost-aware Cloud Bursting for Enterprise Applications"; ACM Transactions on Internet Technology, vol. 13, No. 3; May 2014; whole document (21 pages).

S. Nair et al.; "Towards Secure Cloud Bursting, Brokerage and Aggregation"; 2010 IEEE 8th European Conference on Web Services; Dec. 1-3, 2010; whole document (8 pages).

P. Mell et al.; "The NIST Definition of Cloud Computing: Recommendations of the National Institute of Standards and Technology"; Special Publication 800-145; National Institute of Standards and Technology, U.S. Department of Commerce; Sep. 2011; whole document (7 pages).

M. Daconta; "Containers Add New Efficiency to Cloud Computing"; InformationWeek, Connecting the Business Technology Community; Downloaded from the Internet—http://www.informationweek.com/cloud/containers-add-new-efficiency-to-cloud-computing/d/d-id/1112037?; Oct. 23, 2013; whole document (3 pages).

"What is Docker? An open platform for distributed apps"; Downloaded from the Internet—https://www.docker.com/whatisdocker/; 2014; whole document (3 pages).

List of IBM Patents or Applications Treated as Related.

\* cited by examiner

AUTOMATIC SCALING OF AT LEAST ONE USER APPLICATION TO EXTERNAL CLOUDS

CROSS-REFERENCE TO A RELATED US PATENT APPLICATION

This patent application is a continuation application of copending U.S. patent application Ser. No. 14/539,543, filed on Nov. 12, 2014, the disclosure of which is incorporated by reference herein in its entirety.

TECHNICAL FIELD

The various embodiments of this invention relate generally to data processing systems, methods and computer software and, more specifically, relate to systems, methods and computer software wherein a user's application and associated workload can be instantiated onto a virtual data processing platform such as a public cloud.

BACKGROUND

Cloud computing is an evolving data processing technique. Cloud computing has been described in a number of documents including, for example, a document published by the National Institute of Standards and Technology (NIST), "The NIST Definition of Cloud Computing", Peter Mell, Timothy Grance, NIST Special Publication 800-145, September 2011.

So-called automatic scaling or "auto-scaling" allows users to scale their virtual data processing instances automatically. At least one cloud service provider offers a capability to users via a web service to launch or terminate compute instances. Scaling involves adding or removing servers in an infrastructure environment (horizontal) or may include adding or removing resources to an existing server (vertical).

However, existing approaches to accomplish auto-scaling consider only one cloud environment. These existing approaches thus limit and constrain the elasticity of the cloud concept.

SUMMARY

The embodiments of this invention provide a method, a system and a computer program product configured to automatically auto-scale a user compute instance to multiple cloud providers while considering a multiplicity of user requirements.

The method, executed on a digital data processor, includes obtaining information, via a user interface, that is descriptive of user cloud computing related preferences, including a user cloud computing budgetary preference. The method further includes sensing properties of a plurality of clouds; making decisions, based at least on the obtained information and on the sensed properties of the plurality of clouds, of when to scale up or scale down the user cloud instance, of selecting one of the plurality of clouds as where to scale the user cloud instance, and determining which resource or resources of the selected cloud to add or remove from the selected cloud. The method further includes automatically executing the decisions on the selected cloud.

The system is comprised of at least one data processor connected with at least one memory that stores software instructions, where execution of the software instructions by the at least one data processor causes the system to obtain information, via a user interface, that is descriptive of user cloud computing related preferences, including a user cloud computing budgetary preference; sense properties of a plurality of clouds; and make decisions, based at least on the obtained information and on the sensed properties of the plurality of clouds, of when to scale up or scale down a user cloud instance, of selecting one of the plurality of clouds as where to scale the user cloud instance, and determining which resource or resources of the selected cloud to add or remove from the selected cloud. The system is further configured to automatically execute the decisions on the selected cloud.

The computer program product is comprised of software instructions on a computer-readable medium. Execution of the software instructions using a computer results in performing operations that comprise obtaining information, via a user interface, that is descriptive of user cloud computing related preferences, including a user cloud computing budgetary preference; sensing properties of a plurality of clouds; and making decisions, based at least on the obtained information and on the sensed properties of the plurality of clouds, of when to scale up or scale down a user cloud instance, of selecting one of the plurality of clouds as where to scale the user cloud instance, and determining which resource or resources of the selected cloud to add or remove from the selected cloud. Execution of the software instructions further results in automatically executing the decisions on the selected cloud.

DETAILED DESCRIPTION

Figure 1:
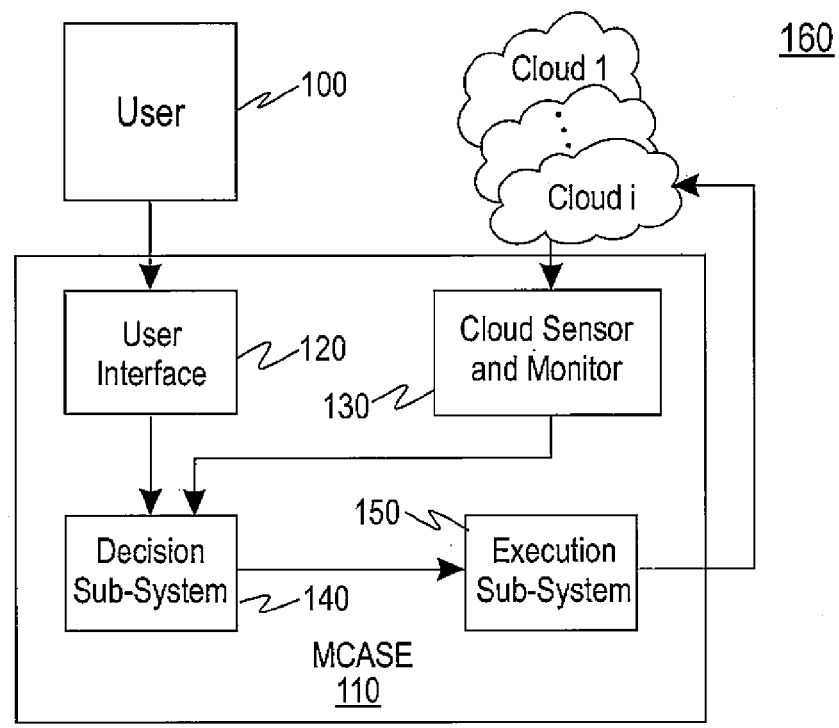
FIG. 1 shows a simplified system block diagram that is useful when discussing a general flow of a method in accordance with embodiments of this invention and the operation of a multi-cloud auto-scaling engine in accordance with embodiments of this invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email).

The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications.

The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and can be owned by an organization selling cloud services.

The public cloud can be shared amongst its users, where the users may belong to different public groups, companies or organizations.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 7:
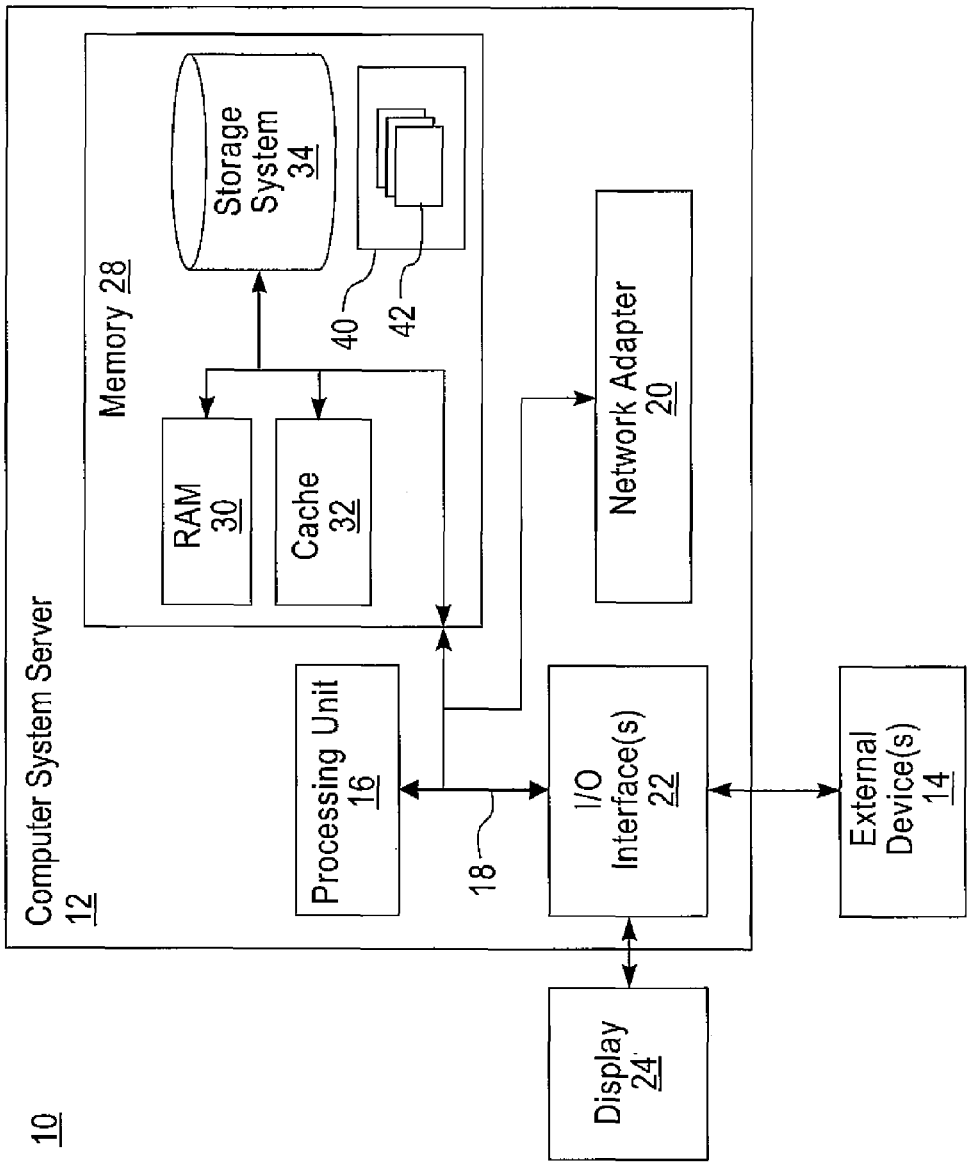
FIG. 7 depicts a cloud computing node according to an embodiment of the present invention.

Referring first now to FIG. 7 there is shown a schematic of an example of a cloud computing node. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 8:
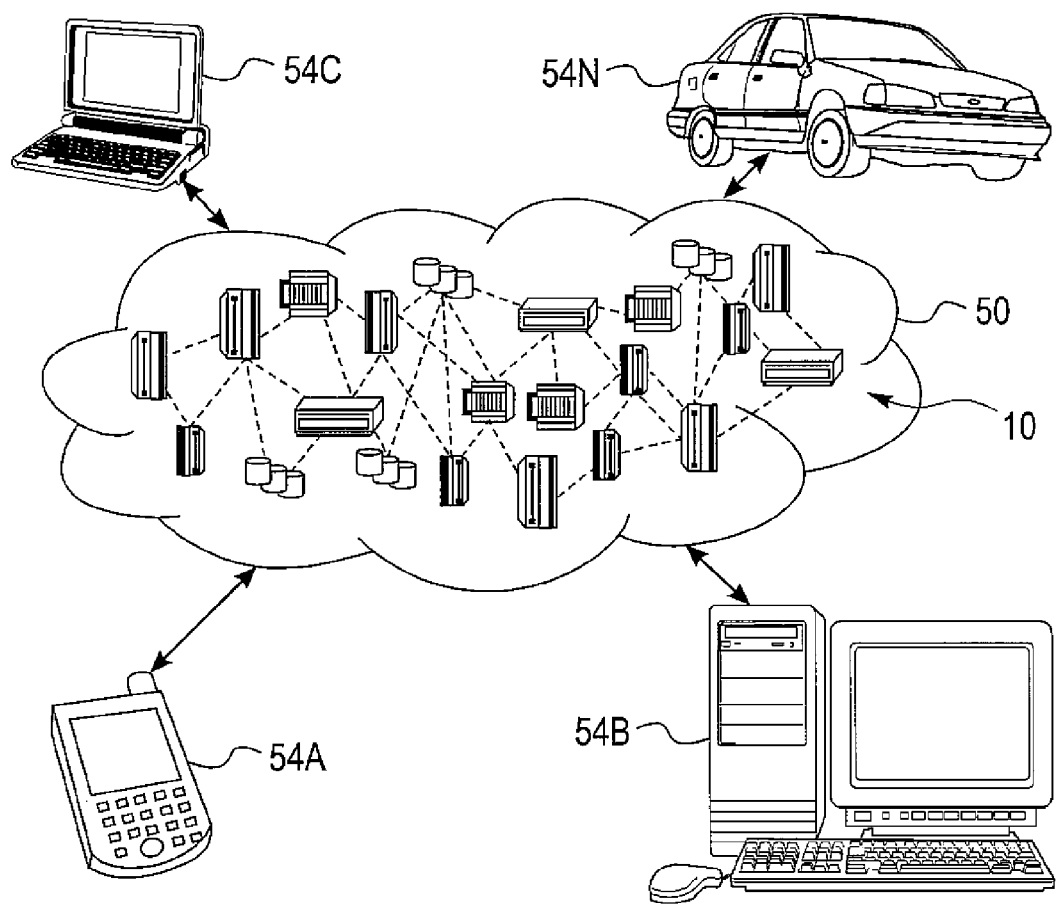
FIG. 8 depicts a cloud computing environment according to an embodiment of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
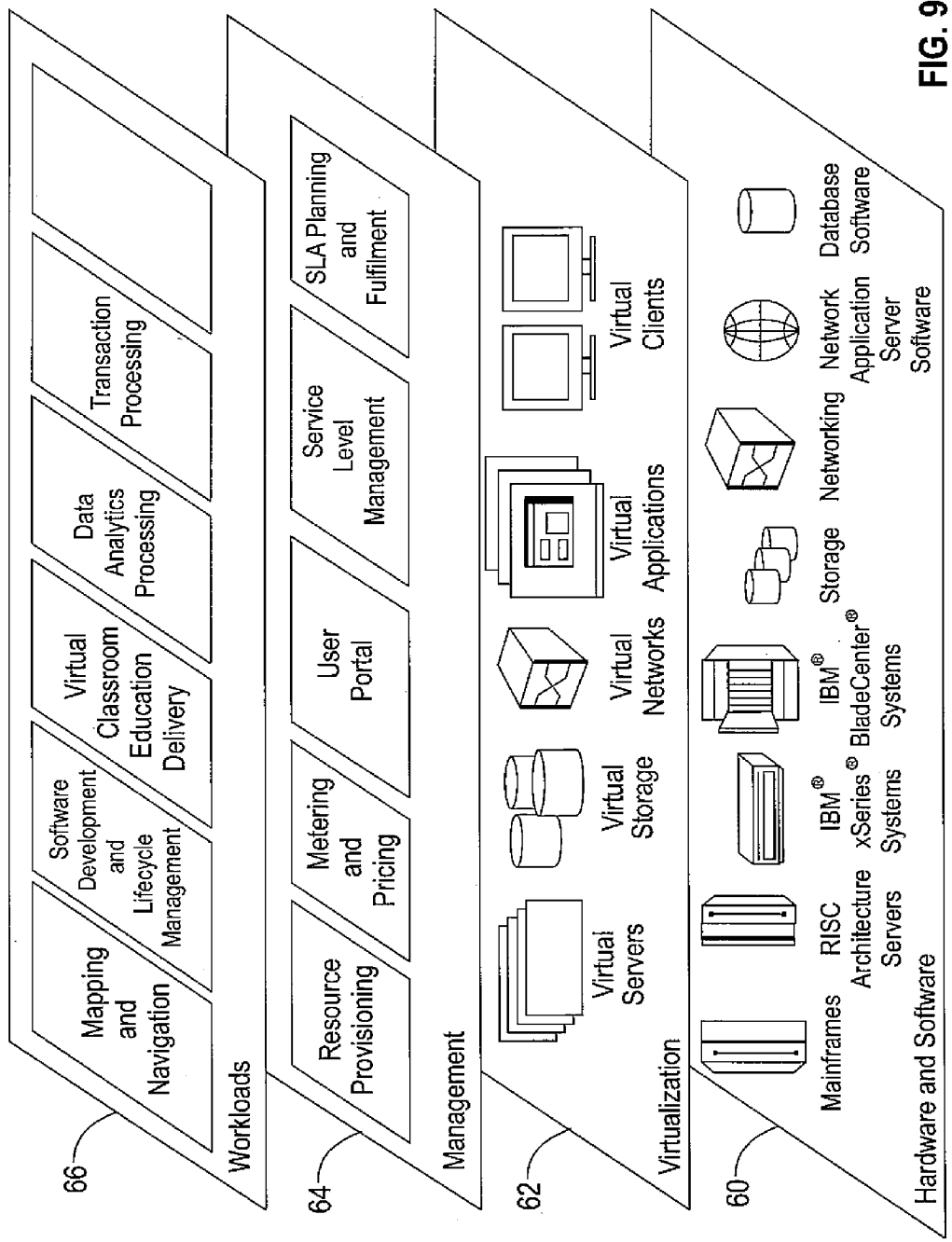
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and other types of useful functionality.

Having thus described one non-limiting technical environment that is related to the embodiments of this invention, it is now noted that one example of a disadvantage inherent in existing approaches to auto-scaling (using a single cloud environment) is a lack of cost inclusion. The reduced flexibility of the single cloud approach to auto-scaling restricts a user to working with an infrastructure that is pre-designed, or requires the user to design an infrastructure that would be sufficient for the user's needs. The lack of an ability to "spill" or auto-scale to another cloud, while possibly still being serviced by an original cloud, limits the user's options. For example, the conventional approach does not allow inter-cloud cost comparisons to be made while designing on-premise infrastructure (e.g., when configuring all or a portion of the user's private cloud).

The various embodiments of this invention address a capability to auto-scale to multiple cloud providers while considering a multiplicity of user requirements. Some existing solutions may consider scaling in multiple availability zones (of a single cloud) to balance a load, but do not consider additional constraints defined by the user.

The embodiments of this invention provide a method and structure and system and computer program(s) for enabling a user to better meet the user's requirements while considering cost and other aspects. This is accomplished at least in part by enabling the user to auto-scale onto multiple cloud environments including multiple public cloud providers.

The examples of the embodiments of this invention automatically determine (without user intervention) when to scale virtual cloud instances (e.g., containers that can share a single operating system and that represent a minimal unit containing resources necessary to run an application, group of virtual machines (VMs) and/or logical groups of VMs) onto which cloud resources of which cloud provider based on user policies. This is accomplished while considering cost, security restrictions and other constraints, in addition to load balancing.

A container can be considered as a form of operating system virtualization that is more efficient than typical hardware virtualization. The container provides the necessary computing resources to run an application as if it is the only application running in the operating system, i.e., with a guarantee of no conflicts with other application containers running on the same machine. A logical group can be considered as a collection of virtual machines that communicate with one another.

The examples of the embodiments of this invention provide for flexible auto-scaling management that considers multiple aspects such as security, cost and availability, in addition to load balancing, while automatically determining (without user intervention) when to scale up/down to which cloud environment of a multiplicity of cloud environments.

The examples of the embodiments of this invention consider multiple requirements of user and cloud provider properties when automatically scaling (up or down) a user's cloud instances among different cloud environments. The use of the embodiments of this invention provides solutions to a number of related sub-problems: when to scale, where to scale and which resource(s) to add (or remove) when scaling.

The examples of the embodiments of this invention consider multiple factors such as cost, properties and capabilities of various cloud providers, security aspects, performance requirements of the user and so forth (not a single point of optimization) and extend auto-scaling into multiple cloud environments.

The use of the embodiments of this invention enables a user's cloud-based compute instance to be scaled up or down, and/or a user's cloud-based storage instance to be scaled up or down, and/or a user's cloud-based communication instance to be scaled up or down, as three examples of cloud-based resource type instances that can be scaled up or down. A reference to a user's "cloud instance" herein should thus be considered as encompassing any type or types of cloud resources that can be associated with a certain user and that are amenable to being scaled up or scaled down in accordance with embodiments of this invention.

Reference is made to FIG. 1 for showing a simplified and non-limiting system block diagram that is useful when discussing a general flow of a method in accordance with embodiments of this invention. The method assumes the presence of a least one user 100. The user 100 could be, for example, a programmer or a data center administrator having one or more software applications/programs that are amenable to being executed in whole or in part in a cloud environment. A private cloud could be associated with the user 100. The user 100 is bi-directionally connected via a network 105, such as a wired and/or a wireless network, to what may be referred to for convenience and not by limitation as a multi-cloud auto-scaling engine (MCASE) 110 that operates in accordance with the embodiments of this invention. The multi-cloud auto-scaling engine 110 is bi-directionally connected for conducting communications with a plurality of clouds 160 (cloud 1-cloud i, where i is equal to or greater than 2). The clouds 160 could include one or more public or private clouds. The cloud or clouds 160 with which the user 100 is currently associated and using may be considered to represent the user's current cloud environment or the user's current cloud computing instance.

The multi-cloud auto-scaling engine 110 includes a plurality of inter-connected and cooperating sub-systems. A first sub-system is a user interface 120 that functions to interact with the user 100 to input user cloud-related requirements. A second sub-system is a cloud sensor and monitor sub-system 130 that queries the clouds 160 to receive cloud properties therefrom. A third sub-system is a decision making unit or more simply a decision sub-system 140. The decision sub-system 140 receives as inputs the user requirements from the user interface sub-system 120 and the sensed cloud properties from the cloud sensor and monitor sub-system 130. The decision sub-system 140 operates on the input information to decide when to scale up or to scale down the user's cloud environment, where the scaling should occur (which cloud or clouds) and which type of cloud resources to use in a selected cloud. A fourth sub-system is an execution unit or execution sub-system 150 that operates to communicate with the clouds 160 to carry out the decision(s) made by the decision sub-system 140.

The multi-cloud auto-scaling engine 110 can be implemented as computer programs (software), as hardware in a system or systems, or as a combination of computer software and hardware.

It should be noted that the functionality of two or more of the sub-systems could be combined. For example, the functionality of one or both of the cloud sensor and monitor sub-system 130 and the execution sub-system 150 could be integrated with the functionality of the decision sub-system 140.

Figure 2:
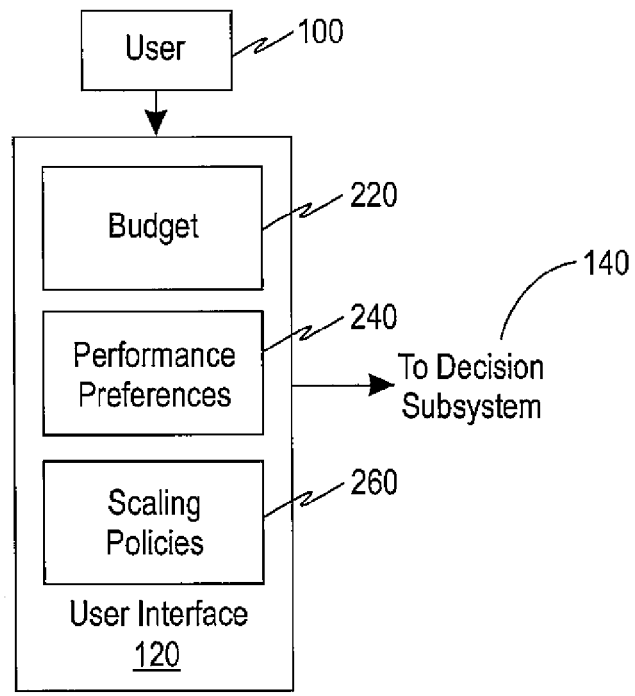
FIG. 2 shows in greater detail a user interface sub-system that forms a part of the multi-cloud auto-scaling engine shown in FIG. 1.

FIG. 2 shows the user interface sub-system 120 in greater detail and details the process of obtaining the user's requirements via an application-programming interface (API). When prompted the user 100 inputs values and information associated with some number of cloud-related requirements such as, but not limited to, budget requirements 220, performance preferences 240 and scaling policies 260. Additional user requirements can include, but are not limited to, a reliability level preference, a location preference, a latency preference (latency tolerance) and other cloud-related requirements. All or at least some of these requirements can be considered by the decision unit 140 when making decisions for when to scale up/scale down a cloud computing instance, where to scale the instance and what type of resources to use in a cloud selected for up-scaling or for down-scaling. For example, the budget requirements 220 can define a constraint of the user for establishing a cost limit regarding public cloud providers. Since the user 100 may own or otherwise be associated with a private cloud, which could be assumed to not charge a fee or to charge a nominal fee for usage, the use of the private cloud could typically be more preferable for a low budget user than the use of a public cloud (so long as the private cloud could satisfy other user requirements such as performance and/or latency). It can be noted that in some embodiments the user 100 may not have access to, or be associated with, a private cloud. The user's budget thus contributes to the cloud environment decision process in terms of cost optimization. The performance preference 240 along with the scaling policies 260 can contribute to the "when" to scale aspect of the decision-making. For example, if the user 100 defines high performance preferences for the cloud that the user 100 is using in terms of keeping utilization of a CPU under some threshold, once the CPU usage for that cloud is greater than the threshold the decision unit 140 can scale up to one or more other cloud providers 160.

In one non-limiting embodiment the scaling policies 260 may include performance preferences as a set of if-then rules to aid in determining when to scale up/down the user's cloud environment. For example, if a certain user application begins to consume more than some threshold CPU capacity then the scaling policy 260 may indicate to start a new instance of the certain user application in order to accommodate the additional CPU usage. Similarly, if the application begins to use fewer resources than some lower threshold specified by the scaling policy 260 then the decision unit 140 may increase overall efficiency by scaling down the application. This can be achieved, for example, by reducing the number of instances of the application. Other requirements, such as the cloud reliability level, the location preference for where the cloud provider is physically located, the latency tolerance and so forth can also be components of the decision process of the decision unit 140. The listed requirements are but a few examples of many other types of requirements.

Figure 3:
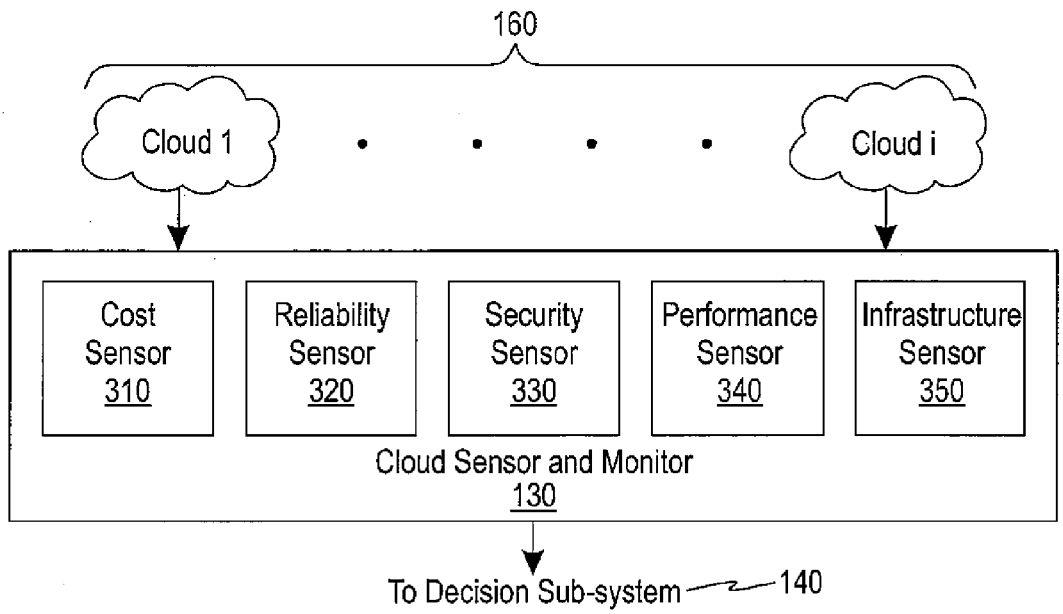
FIG. 3 shows in greater detail a cloud sensor and monitor sub-system that forms a part of the multi-cloud auto-scaling engine shown in FIG. 1.

FIG. 3 shows the cloud sensor and monitor sub-system 130 in greater detail, and illustrates the process of sensing/monitoring the properties of the different clouds 160. Such cloud properties can be, but are not limited to, cost 310, reliability level 320, security level 330, performance level 340, infrastructure properties 350 and so forth. These various cloud properties can be ascertained and monitored through an agent 360 that forms a part of the cloud sensor and monitor sub-system 130. Some of these properties such as cost 310 or infrastructure properties 350 are typically publicly available and can be gathered through use of APIs of the cloud providers themselves. Some other cloud properties, such as the reliability level 320, the security level 330 and/or the performance level 340, can be sensed/monitored via statistical sensing/monitoring of the cloud providers. One suitable technique for accomplishing this is by considering, for example, private and/or public (e.g., user group) knowledge of historical record(s) of application deployments in a particular cloud (e.g., reliability, security, down time) and then deriving insights about such properties. By whatever technique(s) the cloud properties are identified it is assumed that the cloud sensor and monitor sub-system 130 can gather such properties and pass them to the decision sub-system 140.

The cloud sensor and monitor sub-system 130 is capable of monitoring the clouds 160 in real time or substantially real time in order to detect changes in cloud properties such as, but not limited to, complete or partial outages, communication link impairments, changes in cloud availability, security-related issues and other cloud metrics. The cloud sensor and monitor sub-system 130 is then enabled to output the information obtained from the cloud monitoring to the decision sub-system 140 where changes in cloud properties may result in an automatic reconfiguration being made to the currently selected clouds/cloud resources (within the constraints imposed by the user preferences and policies).

Figure 4:
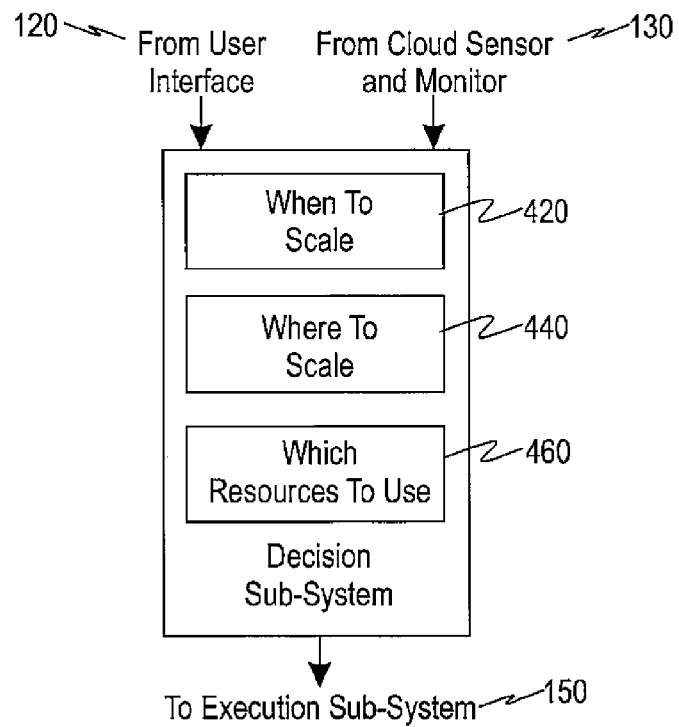
FIG. 4 shows in greater detail a decision sub-system that forms a part of the multi-cloud auto-scaling engine shown in FIG. 1.

FIG. 4 shows the decision sub-system 140. The decision sub-system 140 takes as inputs the user requirements and preferences from the user interface sub-system 120 and the sensed cloud properties from the cloud sensor and monitor sub-system 130. The decision sub-system 140 uses these inputs to decide in scaling decision unit 420 whether a scaling up or a scaling down operation is necessary. The user's scaling policy 260 can be a primary input to the scaling decision to trigger the scaling up or scaling down of a particular instance. The scaling decision operation can be considered as the start of the multi-cloud auto-scaling process. Once a scaling operation is triggered (either up or down) then unit 440 makes a decision as to where to start (on what cloud) the new application instance (if a scale-up is triggered) or where to stop an already running instance (if a scale-down is triggered). The decision process could be accomplished in a number of ways. One suitable technique is to simply match the user requirements to the cloud properties. While this approach may not yield any significant level of optimization it would, however, ensure that the user's requirements are satisfied. While this direct matching approach may be satisfactory for many user applications, other approaches can also be employed. For example, one can define an objective function so as to minimize the spatial and/or communication path distance from the user 100 to where the application is to be executed (where the cloud provider is physically located) in order to reduce data transmission latency and/or or minimize the cost of usage. The use of such an objective function can improve the solution space.

Once the decision is made as to which cloud to use for the scale up or scale down, the next decision is made by a resource unit 460 to determine which resources to employ in the selected cloud. The resource unit 460 solves another optimization problem based on the given user input from the user interface sub-system 120 and the sensed cloud properties from the cloud sensor and monitor sub-system 130.

Based on the application properties defined by the user 100 a method executed by the resource unit selects those resource types (e.g., CPUs, memory, communication adapters, OS, etc.) that would best meet the user's application preferences when scaling up, or the method selects a least appropriate match of resource types for the application when scaling down. The resource unit 460 seeks to ensure an optimum resource-application pairing based on the user requirements and preferences from the user interface sub-system 120 in view of the sensed cloud properties from the cloud sensor and monitor sub-system 130.

Once the decisions are made by the decision sub-system 140 on when to scale, where to scale and which type of cloud resources to use, the execution sub-system 150 executes the decision by communicating with the applicable cloud or clouds 160. If the decision is to scale up on cloud i by using resource type k, then the execution sub-system 150 creates this new instance on the applicable cloud or clouds. Similarly, if the decision is to remove an instance of resource type k from cloud i the execution sub-system 150 communicates with cloud i to accomplish the scale down.

It can be noted that scaling up or scaling down can involve more than one of the clouds 160. For example, if the resource requirements of the user 100 increase significantly, and depending on current cloud availabilities, it can be the case that the decision sub-system 140 will launch two additional instantiations of the user's application, with one being launched, for example, on Cloud 1 and another being launched, for example, on Cloud 3.

What follows is a non-limiting example of the use of the multi-cloud auto-scaling engine 110. The example assumes that a certain cloud user 100 is currently using cloud 1, cloud 2 (an on premise, private cloud of the user in this non-limiting example) and cloud 3. It is also assumed that the certain cloud user has a user requirement vector such that: (a) Budget 220: $5/month and (b) Performance 240: none specified. The user's scaling policy 260 is as follows: (a) scale up if the instance is consuming 85% CPU utilization in its physical resource and (b) scale down if the instance is consuming 20% CPU utilization in its physical resource. A reliability level requirement specifies that a very reliable data center is needed (which can be related to the physical location of a selected cloud). With regard to the user's location preference, assume that the user 100 is located in Europe and is most interested in cloud service provider datacenters that are located primarily in the European region. With regard to the user's latency preference it can be assumed for this example that the application that the user 100 is running does not require low latency and, therefore, the application may run in multiple data centers that are physically isolated from one another. A user demand requirement can be 2 CPU cores usage per instance, no communication.

These various requirements of the user 100 are collected by and output from the user interface sub-system 120 and passed to the decision sub-system 140. In addition, the cloud sensor and monitor sub-system 130 senses, collects and possibly derives (e.g., based on historical usage data) the various properties of the clouds 160 and passes them to the decision sub-system 140. The following Table 1 summarizes exemplary properties of Clouds 1, 2, 3, 4 and 5. Note that while there are a total of five clouds to make decisions for, Cloud 2 is free of charge to the user which implies that Cloud 2 is the user's private cloud. In the example Cloud 2 has zero Availability, meaning that it cannot be considered in the scale-up decision making.

TABLE 1

Different cloud provider properties

| Cloud # | Usage cost per CPU core | Communication cost | Reliability level | Location | Availability in CPU % |
|---|---|---|---|---|---|
| Cloud 1 | 0.02$/core | 0.01$/gbps | Low | Asia-Pacific | 50% |
| Cloud 2 | free | free | High | Europe | 0% |
| Cloud 3 | 2.94$/core | 0.31$/gbps | Med | West Coast | 80% |
| Cloud 4 | 0.05$/core | 0.12$/gbps | Low | East Coast | 100% |
| Cloud 5 | 0.75$/core | 0.25$/gbps | High | Europe | 100% |

It is pointed out that the Availability property can be sub-divided into a plurality of Availabilities such as CPU Availability, Storage Availability and Communication Availability that can be sensed, monitored and considered separately.

In addition to sensing the input in Table 1 the cloud sensor and monitor sub-system 130 further inputs the performance of instances running on the cloud(s). In this specific example the user 100 is already running the instances on Cloud 2 (private cloud) and the cloud sensor and monitor sub-system 130 monitors the performance level of the instance running on Cloud 2. In the example Cloud 2 has zero Availability, meaning that it cannot be considered in the scale-up decision making.

After the user interface sub-system 120 and the cloud sensor and monitor sub-system 130 pass their information to the decision sub-system 140 the decision sub-system 140 begins operation. In this example once the monitored CPU level reaches 85% in Cloud 2 (CPU level is already 100% meaning the CPU Availability is 0% in Table 1), the scaling decision unit 420 makes the decision to scale up the instance. Next, the where-to-scale unit 440 makes the decision on where to scale the instance. One technique to select the cloud that matches the user requirements is to generate a requirement satisfaction vector and select the cloud that exhibits the highest scalar value. Such a requirement satisfaction vector can have binary values, e.g., 1 meaning the requirement is satisfied and 0 meaning the requirement is not satisfied. For example, the Budget requirement is satisfied in all clouds except Cloud 3. The estimated usage cost for each cloud is 0.04, 0, 5.88, 0.1, 0.15 for cloud 1, 2, 3, 4 and 5 respectively. Therefore the requirement satisfaction level for this particular requirement would be [1, 1, 0, 1, 1]. Similarly, one can write the Reliability level satisfaction vector as [0, 1, 0, 0, 1] and a Latency preference vector as [0, 1, 0, 0, 1]. The Availability requirement satisfaction vector is [1, 0, 1, 1, 1]. The user can specify to meet the requirements "softly" (it would be preferred, but not essential, to meet the requirement) or "hard" (must be satisfied). One requirement that preferably is by default always specified as hard is the Availability requirement. If the Availability requirement is not satisfied then that particular cloud is not considered for further selection steps. Assuming that all the requirements are hard, and based on the requirement vectors, Cloud 5 is the only cloud that satisfies all the requirements. The entry wise multiplication of the individual requirement satisfaction vectors (known as Hadamard products) can be helpful to find the cloud or clouds that satisfy the user's requirements. For this non-limiting example the entry wise multiplication is [0, 0, 0, 0, 1] therefore the Cloud 5 is the only cloud that satisfies the user requirements. In response the where-to-scale unit 440 selects Cloud 5 as the scale-up target. Once Cloud 5 is selected for scaling up the instance the resource unit 460 examines the available resource types in Cloud 5. For example a cloud can provide compute and storage instances. If the application that the user 100 is running is primarily a compute instance then the resource unit 460 will select the compute resource to use. The resource types and user instance type match can be done via same method as is performed by the where-to-scale unit 440.

Once the decision sub-system 140 makes all needed decisions the execution sub-system 150 creates the new instance in Cloud 5. Scaling down is similar to scaling up except the instance that will be removed will be removed from the cloud that currently has the least satisfactory requirement satisfaction vector.

The foregoing example is descriptive of but one specific implementation (matching user requirements via vector) of the decision sub-system 140. However, in other embodiments of this invention the decision making process could be based on, as non-limiting examples, linear programming, integer programming or heuristic solutions.

The embodiments of this invention provide for making a rule-based, preferably optimized decision on when to scale an application instance. If optimization criteria are not given by the user 100 then obtaining a feasible solution within the user requirements may be sufficient. The where-to-scale decision made by the unit 440 considers all the conditions as well as the trade-off between cost/performance. The decision sub-system 140 is presented with a multi-dimensional problem that can be solved simultaneously or locally.

Figure 5:
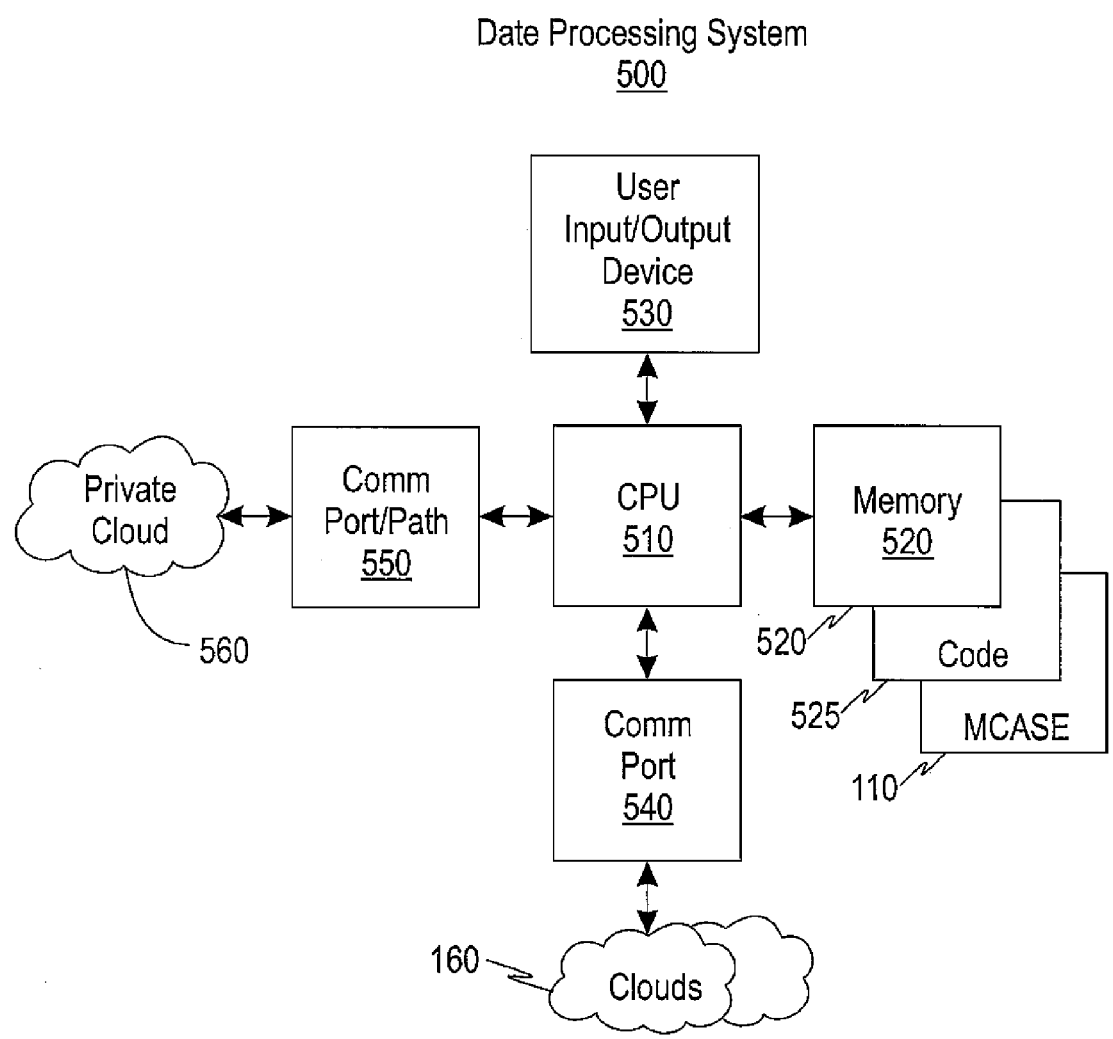
FIG. 5 shows one non-limiting example of a data processing system suitable for hosting the multi-cloud auto-scaling engine shown in FIGS. 1-4.

The multi-cloud auto-scaling engine 110 could be embodied in software stored in a memory of a data processing system owned or controlled by the user 100 and executed as an application by the user's data processing system. FIG. 5 shows one non-limiting example of an embodiment of a data processing system 500 suitable for hosting the multi-cloud auto-scaling engine 110. The data processing system 500 includes at least one data processor or CPU 510 bidirectionally connected with at least one computer-readable data storage medium such as one embodied in memory 520. The memory 520 can store computer program code 525 configured to implement the multi-cloud auto-scaling engine 110 when read from the memory 520 and executed by the CPU 510. Also connected to the CPU 510 is at least one user input/output device 530 (e.g., a keyboard, touch sensitive (display) surface, voice recognition device, etc.,) whereby the user is enabled to enter the user requirements to the API of the user interface 120 of the multi-cloud auto-scaling engine 110. Also connected to the CPU 510 is at least one data communication adapter/port 540 whereby the multi-cloud auto-scaling engine 110 can gain access to the clouds 160. Depending on the implementation the data processing system 500 can also include a communication path 550 to a private cloud 560 (if not connected to the private cloud 560 via the data communication adapter/port 540).

In some embodiments of this invention the data processing system 500 could be implemented with a PC or a workstation, or it could be implemented by a computing center and server functionality associated with a user data center.

In some embodiments of this invention the data processing system 500 could be implemented in a mobile device such as a smart phone or a tablet or similar device and the multi-cloud auto-scaling engine 110 could be implemented as a mobile application (mobile app) that is resident on and executed by the CPU of the mobile device. In this type of embodiment the various communication adapters and paths 540 and 550 could be implemented using wireless technology (e.g., one or more of a cellular link, a wireless local area network (WLAN) link, a Bluetooth link, etc.)

In some embodiments some or all of the computer software and related hardware that embodies the multi-cloud auto-scaling engine 110 could be resident in the user's private cloud 560. In this case, and for the example of the mobile device user platform, the mobile device platform would only need to include software that provides an API to the multi-cloud auto-scaling engine 110 in the user's private cloud.

In some embodiments some or all of the computer software and related hardware that embodies the multi-cloud auto-scaling engine 110 could be resident at a computing system or center of an entity that offers the functionality of the multi-cloud auto-scaling engine 110 as a service, such as a subscription service, whereby the user 100 is enabled by subscription to communicate via a data communications network (wired and/or wireless) to a local area network (LAN) or a wide area network (WAN. e.g., the Internet) to upload the user requirements and any related information and to thus achieve the benefits that result from the use of this invention.

In general then it should thus be realized that the various embodiments of this invention are agnostic with regard to the specifics of the technical implementation and location of the multi-cloud auto-scaling engine 110.

Figure 6:
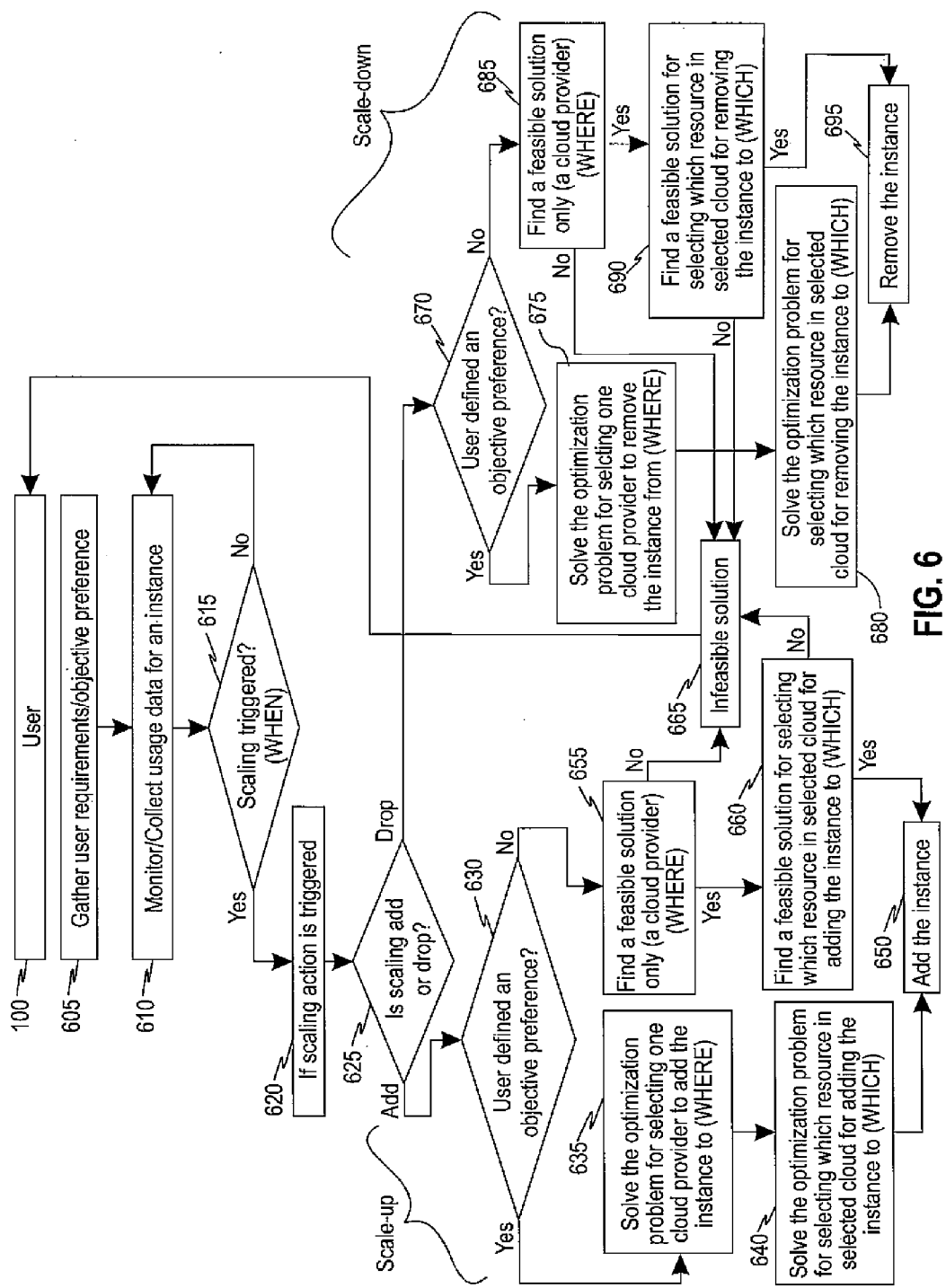
FIG. 6 illustrates a logic flow diagram (flow chart) in accordance with an example of a non-limiting embodiment of this invention.

FIG. 6 shows a logic flow diagram in accordance with one (non-limiting) embodiment of this invention. At Blocks 605 and 610 the user interface sub-system 120 and the cloud sensor and monitor sub-system 130 operates to gather the user's requirements/objective preferences and the monitor/collect usage data for an instance. This information is passed to the decision sub-system 140 that determines at Block 615 when to trigger a scaling operation. If scaling is triggered (Block 620) a decision is made at Block 625 whether to add or drop an instance (scale-up or scale-down). When an instance is to be added, control passes to Block 630 to determine if the user 100 has defined an objective preference. If the user has defined an objective preference control passes to Block 635 to solve the optimization problem for selecting one cloud provider to add the instance to (WHERE), and then to Block 640 to solve the optimization problem for selecting which resource(s) in the selected cloud provider for adding the instance to (WHICH). Control then passes to Block 650 where the execution sub-system 150 adds the instance to the selected cloud provider using the selected resource(s).

If it is determined at Block 630 that the user 100 has not defined an objective preference control passes Block 655 to only find a feasible solution (cloud provider, WHERE). If a feasible solution cannot be found control passes to Block 665 to inform the user 100 that there is no feasible solution at present to scaling up the instance with a cloud provider. Assuming that a feasible solution (cloud provider) is found then control passes to Block 660 to find a feasible solution for selecting which resource in the selected cloud is to be used for adding the instance to (WHICH). If no suitable resource can be found in the selected cloud control passes to Block 665 to so inform the user 100, otherwise control passes to Block 650 where the execution sub-system 150 adds the instance to the selected cloud provider using the selected resource(s).

When the decision made at Block 625 is to drop an instance control instead passes to Block 670 and the flow of Blocks 670-695 mirrors the flow described for Blocks 630-665 except that an instance is removed (if feasible). More specifically, when an instance is to be dropped control passes to Block 670 to determine if the user 100 has defined an objective preference. If the user has defined an objective preference control passes to Block 675 to solve the optimization problem for selecting one cloud provider from which to remove the instance (WHERE), and then to Block 680 to solve the optimization problem for selecting which resource(s) in the selected cloud provider for removing the instance from (WHICH). Control then passes to Block 695 where the execution sub-system 150 removes the instance to the selected cloud provider using the selected resource(s). If it is determined at Block 670 that the user 100 has not defined an objective preference control passes Block 685 to find a feasible solution (cloud provider, WHERE). If a feasible solution cannot be found control passes to Block 665 to inform the user 100 that there is no feasible solution at present to scaling down the instance with a cloud provider. Assuming that a feasible solution (cloud provider) is found then control passes to Block 690 to find a feasible solution for selecting which resource in the selected cloud for removing the instance from (WHICH). If no suitable resource can be found in the selected cloud control passes to Block 665 to so inform the user 100, otherwise control passes to Block 650 where the execution sub-system 150 removes the instance from the selected cloud provider using the selected resource(s).

Based on the foregoing it should be appreciated that embodiments of this invention provide a method, system and computer program product configured for scaling virtual instances (e.g., containers, group of VMs, logical groups, etc.) into multiple cloud environments that maximizes user satisfaction. The method includes obtaining user requirements such as expected performance; cost, security, objective preference and so forth. The method further includes sensing/monitoring properties of clouds such as cost, reliability, security and so forth. The method then makes decisions, based at least on the obtained user preferences and the sensed/monitored cloud properties. The decisions include when to scale, where to scale (to what cloud) and which resources to use (in the selected cloud) for scaling up/down by some number of instances.

Sensing/monitoring the cloud properties can include, but are not limited to, sensing the cost of the cloud, sensing the reliability level of the cloud, sensing the security level of the cloud, sensing the infrastructure properties of the cloud and monitoring the performance level of the cloud.

Making the decisions considers the user requirements, cloud provider properties, and objective preferences of the user and includes when to scale (up/down) based on user defined conditions such as CPU threshold and/or response time, where to scale based on user defined requirements such as budget constraint and/or security conditions, and which (what type of) resource(s) to use in different clouds, such as different VM types.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As such, various modifications and adaptations may become apparent to those skilled in the relevant arts in view of the foregoing description, when read in conjunction with the accompanying drawings and the appended claims. As but some examples, the use of other similar or equivalent mathematical expressions may be used by those skilled in the art. However, all such and similar modifications of the teachings of this invention will still fall within the scope of this invention.

What is claimed is:

1. A system, comprising:
at least one data processor connected with at least one memory that stores software instructions, where execution of the software instructions by the at least one data processor causes the system to:
obtain information, via a user interface, that is descriptive of user cloud computing related preferences, wherein the user cloud computing related preferences comprises at least a user cloud computing budgetary preference, a location preference, a performance preference and a reliability level preference, and wherein the information further comprises indications on whether each of the user cloud computing related preferences is either required or preferred;
sense properties of a plurality of clouds including at least reliability, cost, security, location, performance and infrastructure properties, wherein the sensed cost and infrastructure properties are obtained directly from a cloud provider via an application program interface of the cloud provider, and wherein the reliability, security, and performance properties are obtained at least in part based on one or more historical records of application deployments in each of the plurality of clouds;
make decisions, based at least on the obtained information and on the sensed properties of the plurality of clouds, of when to scale up or scale down a user cloud instance, of selecting one of the plurality of clouds as where to scale the user cloud instance, and determining which resource or resources of the selected cloud to add or remove from the selected cloud; where
in response to detection of a presence of a trigger to perform a user cloud instance scale up operation, solve a first optimization problem to select where to scale up the user cloud instance by selecting one of the plurality of clouds to add the user cloud instance to and then solve a second optimization problem to select which resource or resources in the selected cloud to add the user cloud instance to, where the selected resource or resources comprise at least one of memory, communication adapters and operating system, wherein selection of the one of the plurality of clouds to add comprises generating a requirement satisfaction vector for each of the user cloud computing related preferences comprising binary values indicating whether each of the plurality of clouds satisfy a given one of the user cloud computing related preferences, and selecting the cloud based on both the requirement satisfaction vectors and the obtained indications on whether each of the user cloud computing related preferences is either required or preferred; and automatically execute the decisions on the selected cloud.

2. The system of claim 1, where the user's cloud instance is being executed on a private cloud when the decisions are executed, and where the selected cloud is a public cloud.

3. The system of claim 1, where the obtained information descriptive of user cloud computing related preferences comprises a latency preference, in addition to the user cloud computing budgetary preference, the performance preference, the reliability level preference, and the location preference.

4. The system of claim 1, where the obtained information is further descriptive of a user objective preference as to a certain cloud provider or cloud providers.

5. The system of claim 1, where the making decisions is automatically triggered by at least a change in a user application instance so as to require more cloud resources or less cloud resources.

6. A computer program product comprised of software instructions on a non-transitory computer-readable medium, where execution of the software instructions using a computer results in performing operations comprising:

obtaining information, via a user interface, that is descriptive of user cloud computing related preferences, wherein the user cloud computing related preferences comprises at least a user cloud computing budgetary preference, a location preference, a performance preference, and a reliability level preference, and wherein obtaining the information further comprises obtaining indications on whether each of the user cloud computing related preferences is either required or preferred;

sensing properties of a plurality of clouds including at least a reliability, cost, security, location, performance, and infrastructure properties, wherein the sensed cost and infrastructure properties are obtained directly from a cloud provider via an application program interface of the cloud provider, and wherein the reliability, security, and performance properties are obtained at least in part based on one or more historical records of application deployments in each of the plurality of clouds;

making decisions, based at least on the obtained information and on the sensed properties of the plurality of clouds, of when to scale up or scale down a user cloud instance, of selecting one of the plurality of clouds as where to scale the user cloud instance, and determining which resource or resources of the selected cloud to add or remove from the selected cloud, wherein selecting one of the plurality of clouds to add comprises generating a requirement satisfaction vector for each of the user cloud computing related preferences comprising binary values indicating whether each of the plurality of clouds satisfy a given one of the user cloud computing related preferences, and selecting the cloud based on both the requirement satisfaction vectors and the obtained indications on whether each of the user cloud computing related preferences is either required or preferred;

where in response to detecting a presence of a trigger to perform a user cloud instance scale up operation, solving a first optimization problem to select where to scale up the user cloud instance by selecting one of the plurality of clouds to add the user cloud instance to and then solving a second optimization problem to select which resource or resources in the selected cloud to add the user cloud instance to, where the selected resource or resources comprise at least one of memory, communication adapters and operating system; and automatically executing the decisions on the selected cloud.

7. The computer program product of claim 6, where the user's cloud instance is being executed on a private cloud when the decisions are executed, and where the selected cloud is a public cloud.

8. The computer program product of claim 6, where the obtained information descriptive of user cloud computing related preferences comprises a latency preference, in addition to the user cloud computing budgetary preference, location preference and reliability level preference at least one of a performance preference.

9. The computer program product of claim 6, where the obtained information is further descriptive of a user objective preference as to a certain cloud provider or cloud providers.

10. The computer program product of claim 6, where the operation of making decisions is automatically triggered by at least a change in a user application instance so as to require more cloud resources or less cloud resources.

11. The system of claim 1, where execution of the software instructions by the at least one data processor further causes the system to:

in response to the presence of the trigger initially determine whether the trigger is to scale up or scale down the user cloud instance, where in response to determination that the trigger is to scale up the user cloud instance, determine if there exists a user-defined objective preference and, if the objective preference is determined to exist, then solve the first optimization problem and the second optimization problem.

12. The system of claim 11, where if it is determined that the user-defined objective preference does not exist, the system is further caused to:

attempt to find a feasible solution by selecting a suitable cloud to add the user cloud instance to and selecting a suitable resource in the selected cloud for adding the user cloud instance to; and if no feasible solution can be found for selection of either a suitable cloud or a suitable resource in a selected cloud, inform the user.

13. The system of claim 1, where execution of the software instructions by the at least one data processor further causes the system to:

in response to the presence of the trigger initially determine whether the trigger is to scale up or scale down the user cloud instance, where in response to determination that the trigger is to scale down the user cloud instance, determine if there exists a user-defined objective preference and, if the objective preference is determined to exist, then solve a first optimization problem to select where to scale down the user cloud instance by selecting one of the plurality of clouds to remove the user cloud instance from and then solve a second optimization problem to select which resource or resources in the selected cloud to remove the user cloud instance from.

14. The system of claim 13, where if it is determined that the user-defined objective preference does not exist, the system is further caused to:

attempt to find a feasible solution by selecting a suitable cloud to remove the user cloud instance from and selecting a suitable resource in the selected cloud to remove the user cloud instance from; and if no feasible solution can be found for selecting either a suitable cloud or a suitable resource in a selected cloud, inform the user.

15. A system, comprising:
at least one data processor connected with at least one non-transitory memory that stores software instructions, where execution of the software instructions by the at least one data processor causes the system to:
obtain information, via a user interface, that is descriptive of user cloud computing related preferences, wherein the user cloud computing related preferences comprises at least a user cloud computing budgetary preference, a location preference, a performance preference and a reliability level preference, and wherein the information further comprises indications on whether each of the user cloud computing related preferences is either required or preferred;
sense properties of a plurality of clouds including at least reliability, cost, security, location, performance and infrastructure properties, wherein the sensed cost and infrastructure properties are obtained directly from a cloud provider via an application program interface of the cloud provider, and wherein the reliability, security, and performance properties are obtained at least in part based on one or more historical records of application deployments in each of the plurality of clouds;
make decisions, based at least on the obtained information and on the sensed properties of the plurality of clouds, of when to scale up or scale down a user cloud instance, of selecting one of the plurality of clouds as where to scale the user cloud instance, and determining which resource or resources of the selected cloud to add or remove from the selected cloud, wherein selection of the one of the plurality of clouds to add comprises generating a requirement satisfaction vector for each of the user cloud computing related preferences comprising binary values indicating whether each of the plurality of clouds satisfy a given one of the user cloud computing related preferences, and selecting the cloud based on both the requirement satisfaction vectors and the obtained indications on whether each of the user cloud computing related preferences is either required or preferred; and
automatically execute the decisions on the selected cloud;
where in response to the presence of a trigger that is automatically generated by at least a change in a user application instance so as to require more cloud resources or less cloud resources, the system is further caused to initially determine whether the trigger is to scale up or scale down the user cloud instance, where
in response to determination that the trigger is to scale up the user cloud instance, determine if there exists a user-defined objective preference and, if the objective preference is determined to exist, the system is further cause to solve a first optimization problem to select where to scale up the user cloud instance by selecting one of the plurality of clouds to add the user cloud instance to and then solve a second optimization problem to select which resource or resources in the selected cloud to add the user cloud instance to.

16. The system of claim 15, where the user's cloud instance is being executed on a private cloud when the decisions are executed, and where the selected cloud is a public cloud.

* * * * *